(No Model.)
W. BORCHERS.
ASPIRATOR AND AIR INJECTOR.
No. 493,012. Patented Mar. 7, 1893.
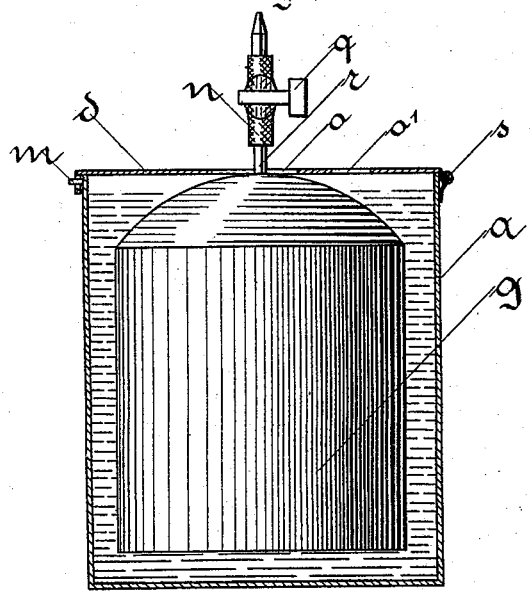
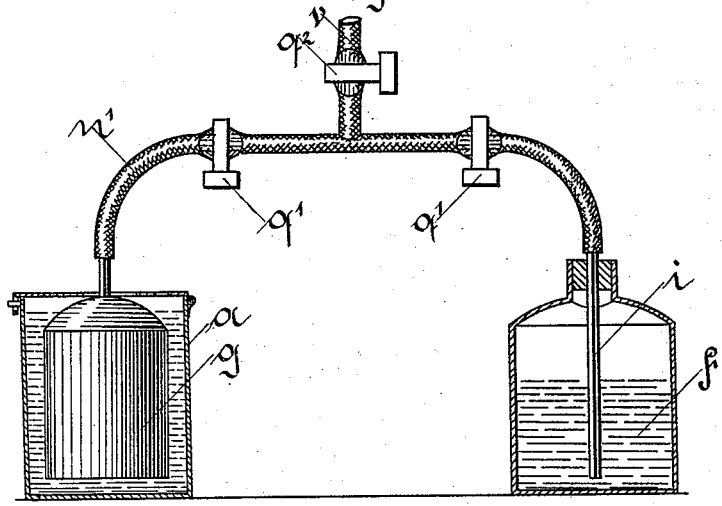
WITNESSES:
M. C. Pinckney
M. A. Cunningham.
INVENTOR:
Warnerus Borchers
By Bowen & Behrens
Attorneys.

UNITED STATES PATENT OFFICE.

WARNERUS BORCHERS, OF MUNICH, GERMANY.

ASPIRATOR AND AIR-INJECTOR.

SPECIFICATION forming part of Letters Patent No. 493,012, dated March 7, 1893.

Application filed October 7, 1892. Serial No. 448,125. (No model.)

*To all whom it may concern:*

Be it known that I, WARNERUS BORCHERS, doctor of medicine, medical practitioner, a subject of the King of Prussia, and residing at Munich, Bavaria, German Empire, have invented certain new and useful improved apparatus for suction or injection of air or other fluids or matters, principally for surgical purposes, of which the following is a specification.

The object of this invention is principally to provide apparatus for removing matters by suction whether gaseous, such as air, gases or vapor, or liquid, or solid matters such as may be enabled to flow and it is intended principally for the removal of physiological or pathological fluids or liquids or such gases or foreign matters as may be found or occur in various parts of the body.

The apparatus may be modified so as to be suitable also for injection, for instance in the place of irrigators or sprays, or as in many operations is required when alternate puncture and injection are necessary.

In the accompanying drawings forming part of this specification Figure 1 represents a view partly in vertical cross-section of a device embodying my invention, and Fig. 2 shows the apparatus arranged so as to be used for injection as well as for suction purposes.

The apparatus consists essentially as shown in Fig. 1, of two parts, first, an outer vessel $a$ made of sheet metal and intended for boiling purposes, being provided with a lid $d$ hinged at $s$ and provided with a pin $m$ for securing it; and second, a glass vessel, or flask $g$ of somewhat smaller dimensions than the outer vessel $a$ and intended to be placed therein, the said vessel $g$ terminating above in a pipe $r$ over which a flexible tube is stretched as shown at $n$, this tube being provided with a clamp or compressor $q$ for closing it, or with a cock in place thereof as desired.

To use this apparatus a small quantity of water, or antiseptic solution, or in fact any liquid which develops vapor on heating to be again condensed on cooling, is placed in the flask $g$ for instance to the height of about one centimeter. The flask is then placed in the vessel $a$ and the lid $d$ closed, the pipe $r$ projecting through the opening $o$. The vessel $a$ is then filled with water through the opening $o'$ in the lid until nearly up to the edge. The water causes the vessel $g$ to rise until it is prevented from rising farther by the lid $d$. Heat is then applied to the vessel $a$, for instance by placing it over a spirit lamp, until the liquid in the flask $g$ is converted into vapor filling the said vessel and expelling the air, the compressor $q$ being loosened during this process. If now the compressor be closed and the vessel suffered to cool the vapor in the flask $g$ is condensed and forms a vacuum, or so called vacuum in the flask $g$. The vessel is thus prepared for use as an aspirator when desired, it being used by bringing the nozzle of the tube $n$ into the opening or place from which fluid or matter is to be drawn and loosening the compressor $q$ as required.

Fig. 2, shows the apparatus so arranged as to be useful for injection as well as suction. $f$ is a flask, into which the pipe $i$ projects nearly to the bottom, this pipe being connected by a tube $n'$ with the branch tube $v$. The tube $n'$ leads also to the flask $g$ before described and serves also for the communication between the flask $g$ and the branch tube $v$. The branch tube may have a compressor $q^2$, for closing it, and two compressors $q'$ are severally arranged on the tube $n'$ to close communication with the flasks $g$ and $f$ respectively. Cocks may be used instead of compressors. It is obvious that either flask $g$ or $f$ may be placed in communication with the branch $v$ to the exclusion of the other by loosening the respective compressor $q'$ while the other is kept closed. The flask $f$ is half filled with the desired liquid to be used as an injection-spray or otherwise and heat is applied to the air contained in the closed space above this liquid, the air or vapors therein are expanded and brought under pressure ready to force the liquid out at the pipe $i$ when the communication with the latter is opened.

Where the apparatus is connected as described and shown in Fig. 2 it is sufficient in warming the flask $g$ to allow the air driven from that flask to pass along the tube $n'$, the compressors $q'$ being loosened, and thus enter the flask $f$ providing the extra air pressure desired therein. The apparatus so prepared is then ready for use and may be employed with facility for either injection or suction as may be required at the moment. Either flask $f$ or $g$ may however be used alone if desired.

Having thus described my invention, what I claim as new, and desire to secure by Letters Patent, is—

1. An apparatus for suction of matter whether gaseous, such as air, gas or vapor, liquid, or solid suitable to be extracted by such apparatus, the same comprising an inner flask $g$ with tube $r$ connected by flexible tube $n$ with a suction-nozzle, and an outer vessel $a$ intended to serve as a water bath for the flask $g$ to be heated to expel the air from said flask and to evaporate a liquid therein which upon subsequent cooling and condensation provides a vacuum in said flask for the purpose of suction as described.

2. The combination of the aforesaid apparatus of a second flask $f$ connected to the flask $g$ by a pipe whereby the air or gases expelled from flask $g$ enter the flask $f$ to provide pressure upon liquid therein to act as an injection-spray or the like as described.

Signed at Munich this 19th day of September, 1892.

WARNERUS BORCHERS.

Witnesses:
JOS. GUNTERMANN,
   *Maler*.
T. ANT. DÜRMÜLLER,
   *Maler*.